(12) United States Patent
Popoola et al.

(10) Patent No.: US 6,231,309 B1
(45) Date of Patent: May 15, 2001

(54) SHAPED AND FINISHED METALLIC TORQUE CONVERTER REACTOR

(75) Inventors: Oludele Olusegun Popoola, Novi; Larry Van Reatherford, Clarkston; Robert Corbly McCune, Southfield; Ronald Paul Cooper, Eastpointe, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/335,961

(22) Filed: Jun. 18, 1999

(51) Int. Cl.$^7$ .................................................. F01D 25/00
(52) U.S. Cl. .................. 416/244 R; 416/197 C; 416/241 R; 415/915; 415/200
(58) Field of Search ..................... 415/200, 915; 416/197 C, 1, 180, 241 R, 244 R; 60/330–367; 29/889.5; 219/69.17, 69.2; 384/121, 123

(56) References Cited

U.S. PATENT DOCUMENTS

| | | | |
|---|---|---|---|
| 4,097,710 | * 6/1978 | Maillet | 219/69 D |
| 4,441,315 | * 4/1984 | Bochot | 60/345 |
| 4,522,513 | * 6/1985 | Nozue et al. | 384/368 |
| 5,094,076 | * 3/1992 | Henricks | 60/345 |
| 5,480,497 | * 1/1996 | Zaluzec et al. | 148/512 |

OTHER PUBLICATIONS

Metals Handbook 8th Edition, vol. 3, Machining, American Society for Metals, 1967.*

Metals Handbook Ninth Edition, vol. 8, Mechanical Testing, ASM, 1985.*

* cited by examiner

*Primary Examiner*—Christopher Verdier
*Assistant Examiner*—Richard Woo

(57) ABSTRACT

Transmission torque converter reactor thrust washer segments (12) comprising a surface hardenable aluminum alloy are subjected to electrical discharge machining (EDM) using an electrode (26) and under conditions effective to impart a hydrodynamic bearing surface profile to the segment surfaces (12a), reduce segment surface roughness, and increase segment surface hardness. Torque converter reactors (10) having integrated thrust washer segments machined in this manner exhibit improved wear resistance and hydrodynamic lift when compared to as cast thrust washer segments.

13 Claims, 3 Drawing Sheets

SHAPED AND FINISHED METALLIC TORQUE CONVERTER REACTOR

BACKGROUND OF THE INVENTION

1. Field of the Invention

The invention relates to automatic transmission torque converter reactors having integral, segmented thrust washers on the reactor hub and a method for concurrently shaping, surface finishing, and surface hardening the thrust washers for improved wear resistance and hydrodynamic lift.

2. Description of Related Art

Certain automatic transmission torque converter reactors are fabricated by injection molding phenolic resin to a desired complex reactor configuration having a reactor hub with an integrated segmented thrust washer. The raised thrust washer segments are trapezoidal in shape and are arranged circumferentially on an axial end face of the reactor hub as shown in FIG. 1. The thrust washer segments include axial end surfaces that collectively define a reactor thrust bearing that cooperates with a counterface, typically a low carbon powder metallurgy steel turbine hub of the torque converter assembly. The axial end surfaces of the washer segments are provided with a curvilinear profile to provide hydrodynamic lift relative to the turbine hub.

In attempts to increase the performance envelope of certain automatic transmissions and reduce cost, die cast aluminum-alloy torque converters have been evaluated to replace molded phenolic resin torque converters used heretofore in automatic transmissions. However, die cast aluminum alloy torque converter reactors with integrated thrust washer segments exhibit increased segment surface roughness and have less desirable segment surface profiles when compared to molded phenolic counterparts. Moreover, the segments exhibit variable shapes due to inadequate metal casting precision. Applicants have discovered through dynamometer test evaluations of such die cast aluminum torque converter reactors operated with a steel turbine hub that die cast aluminum reactors suffered excessive wear on the thrust surfaces, evidenced by loss of the as-fabricated profile and excessive grooving of the thrust surfaces of the reactor thrust washer segments and a reduction in height of the segments to less than 20% of their initial design height. Such excessive wear and deterioration was attributed to metal-to-metal contact between the aluminum thrust washer segments and the turbine hub. This problem of wear and deterioration effectively rendered the die cast aluminum alloy torque converter reactors unacceptable for use. In one solution to the problem, needle bearing assemblies have been positioned between the reactor thrust face and the turbine hub in certain automatic transmissions to reduce the severity of contact.

Thus, there is a need for a surface treatment for a cast metallic torque converter reactor in a manner to impart improved wear resistance and hydrodynamic lift to the reactor thrust washer segments and permit use of the cast metallic torque converter reactor without the need for costly needle bearings.

SUMMARY OF THE INVENTION

An object of the present invention is to satisfy this need by subjecting metallic torque converter reactor thrust washer segments comprising, for example only, a surface hardenable aluminum alloy, to electrical discharge machining (hereafter EDM) under conditions effective to impart a desired bearing profile to all of the segment surfaces and simultaneously to reduce surface roughness and preferably increase surface hardness of the segment surfaces. Additionally, use of EDM permits the formation of a surface contour on the thrust washer segment surfaces such that an oil retention recess may be formed in each segment. An illustrative embodiment of the invention involves die casting a surface hardenable aluminum alloy to form a torque converter reactor having reactor thrust washer segments arranged radially and spaced apart circumferentially on a reactor hub and selectively electrical discharge machining the as-cast reactor segments, with or without use of a vibratory electrode and polishing particulates in the dielectric fluid, to achieve the above benefits of the invention. Die cast torque converter reactors having reactor segments electrical discharge machined pursuant to the invention exhibit improved wear resistance and hydrodynamic separation in transmission dynamometer tests.

DETAILED DESCRIPTION OF THE PREFERRED EMBODIMENT

Figure 1:
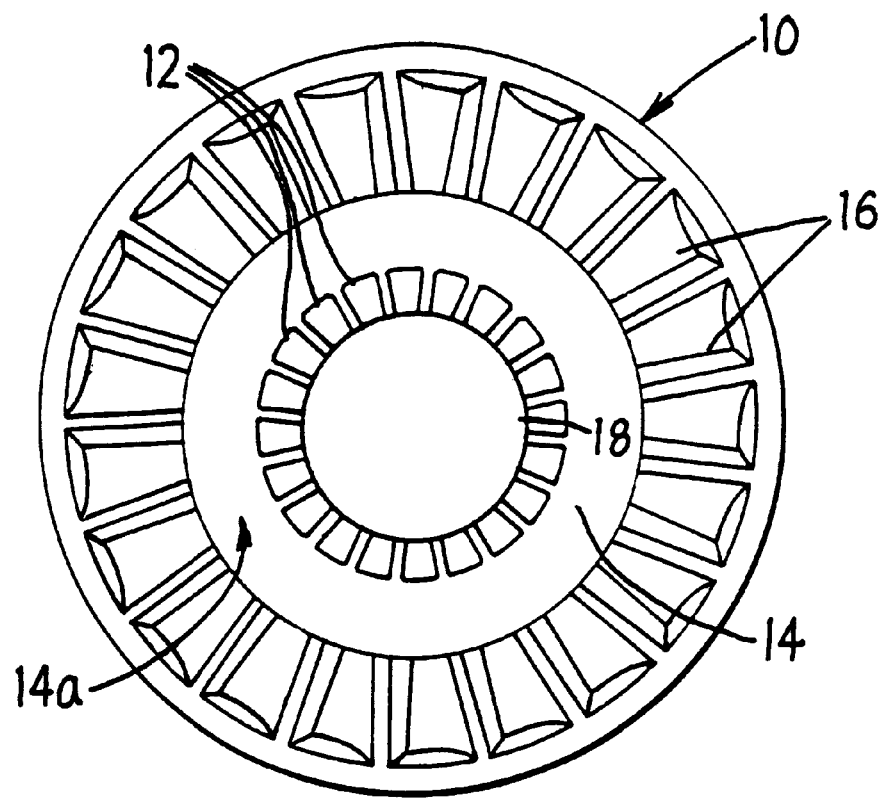
FIG. 1 is an elevation view of a die cast aluminum alloy torque converter reactor having thrust washer segments that can be electrically discharge machined pursuant to the invention.

Referring to FIG. 1, a die cast aluminum alloy automatic transmission torque converter reactor 10 having reactor thrust washer segments 12 that can be electrical discharge machined pursuant to an embodiment of the invention is illustrated. The torque converter reactor is die cast of an aluminum alloy or suitable light metal alloy, such as a magnesium alloy, which is surface hardened following electrical discharge machining as described below, although casting techniques other than die casting (e.g. sand casting or permanent mold casting) can be used to form the torque converter reactor 10. Suitable die casting aluminum alloys include, but are not limited to, commercially available aluminum alloys that include silicon as an alloying element and that are designated 308, 380, 383, 390, 413, and HD-2 (designation of Gibbs Die Casting Corporation, 369 Community Dr., Henderson, Ky.).

The die cast torque converter reactor 10 includes a central hub 14 and a plurality of outer, circumferentially spaced vanes 16 extending radially from the hub 14 to the outer reactor periphery in conventional manner. The hub 14 includes an axial end face 14a on which the thrust washer segments 12 are integrally cast and arranged circumferentially, spaced about a central transmission shaft-receiving opening or bore 18, which is integrally cast with the reactor. The reactor thrust washer segments 12 each comprise a raised trapezoidal-shaped region as is common practice for segmented thrust washers and segment surfaces 12a that collectively define the reactor thrust bearing that cooperates with a counterface of a low carbon, powder metallurgy steel hub (not shown) of the torque converter turbine. The axial end surfaces 12a are provided with a curvilinear profile to provide hydrodynamic separation relative to the turbine hub during turbine operation. As mentioned above, applicants have discovered through transmission dynamometer tests that such die cast aluminum torque converter reactors operated with a powder metallurgy steel turbine hub suffer excessive wear as evidenced by loss of thrust segment design profile, severe grooving of segment axial end surfaces 12a, and a reduction in height of the thrust bearing segments 12 to less than 20% of their initial height. Such excessive wear and deterioration was attributed to metal-to-metal contact between the reactor thrust washer surfaces 12a and the turbine hub.

The present invention involves in one embodiment subjecting the die cast aluminum alloy torque converter reactor thrust segments 12 of FIG. 1 to electrical discharge machining (hereafter EDM) under conditions effective both to improve the surface profile and reduce surface roughness of thrust segment surfaces 12a, while increasing the hardness of the surfaces 12a. In another embodiment of the invention, the thrust washer segments 12 are subjected to electrical discharge machining with concurrent vibratory polishing under conditions also effective both to improve the surface profile and reduce surface roughness of thrust segment surfaces 12a, while increasing the hardness of the surfaces 12a. Use of vibratory polishing (i.e. vibratory electrode and abrasive polishing particles) during electrical discharge machining reduces the time to achieve a reduced surface roughness on the thrust washer segments. In yet another embodiment, the invention is practiced to also form an oil retention recess 12b, FIG. 4C, in each thrust segment surface 12a to improve hydrodynamic lift relative to the turbine hub.

Figure 3:
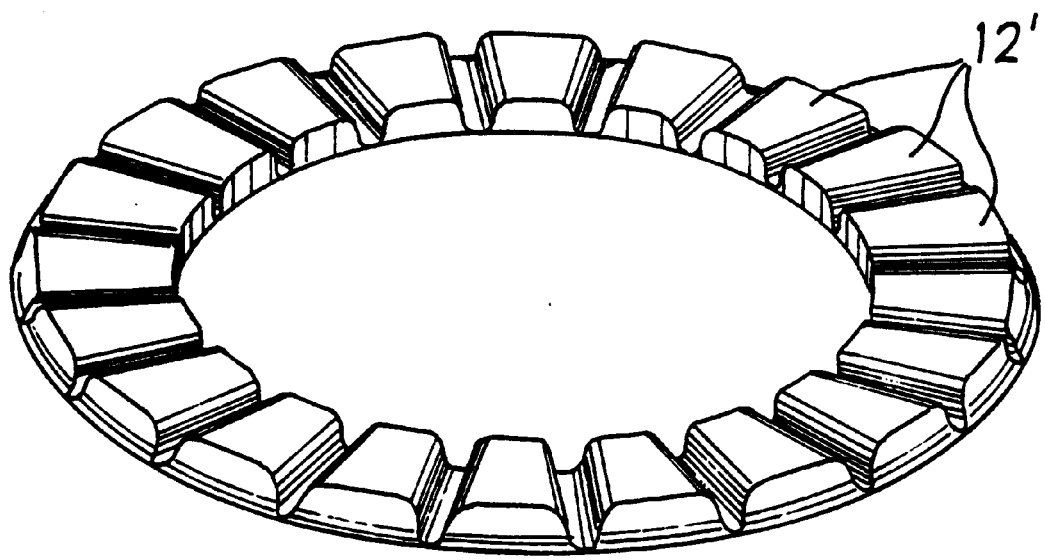
FIG. 3 is a three dimensional image of reactor segments of a phenolic resin reactor which have been replicated on the EDM electrode tool.
Figure 2:
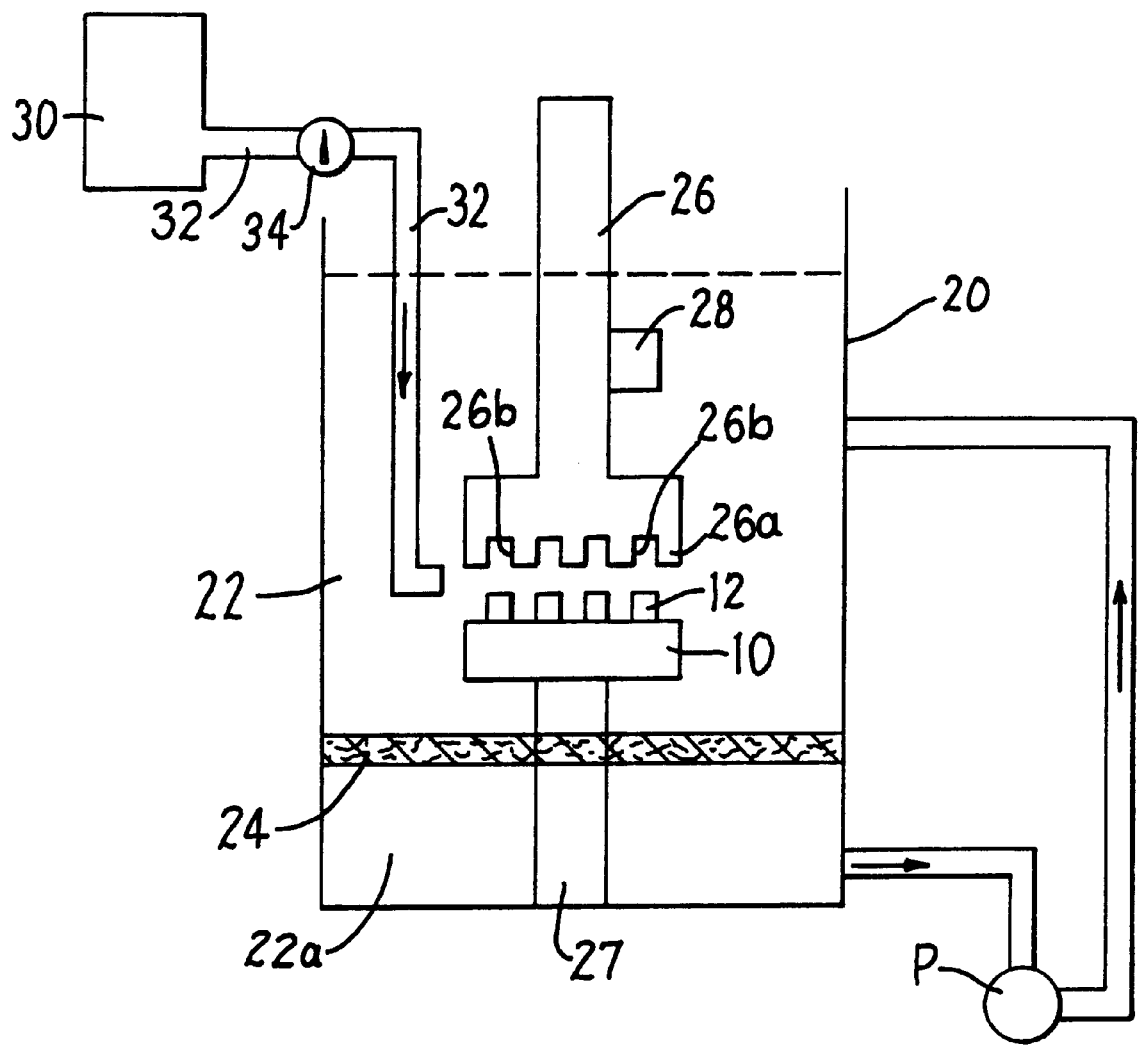
FIG. 2 is a schematic view of apparatus for concurrently electrically discharge machining and optionally vibratory polishing die cast aluminum alloy torque converter reactor thrust washer segments pursuant to the invention.

FIG. 3 is a schematic view of apparatus for concurrently electrically discharge machining and vibratory polishing die cast aluminum alloy torque converter reactor thrust washer segments 12 pursuant to the invention. The EDM apparatus comprises a tank 20 with a dielectric fluid 22 therein and filtered and recirculated by filter 24 and recirculating pump P. A copper electrode tool 26 comprises the anode, while the torque converter reactor 10 (workpiece) to be machined comprises the cathode of the EDM circuit. The reactor 10 is mounted on a fixture 27. The electrode 26 and fixture 27 are connected to a source of electrical power (not shown) to apply a voltage between the anode electrode 26 and fixture 27 and reactor 10 (cathode). Machining can be conducted under machine settings or conditions specified as E3, E7, E383 on the machine manufacturer's chart provided with model Robofil EDM machine made by Charmille Technologies, 560 Bond Street, Lincolnshire, Ill. 60069. Typically, a voltage and pulsed electrical current in the respective ranges of 70–110V and 2–10A are applied between the anode electrode 26 and the reactor 10 in pulses of 20 to 100 kHz to effect machining. An ultrasonic vibrator 28 can be mechanically fastened to the electrode 26 and designed to vibrate at a frequency of 2 to 5 kHz. The ultrasonic vibrator and pulse frequencies of the EDM machine are desynchronized to minimize embedding of abrasive polishing particles in the dielectric fluid in the surfaces of the reactor thrust washer segments 12 during concurrent machining and vibratory polishing. By desynchronization is meant that the EDM and ultrasonic vibrator frequencies are out of phase.

The dielectric fluid comprises ambient temperature kerosene fluid that has dispersed therein polishing abrasives, such as SiC, $Al_2O_3$ or BN particles of 100 to 200 micrometers diameter which are stored in hopper 30 and fed through the tube 32 and no-return regulating valve 34 into the gap between the electrode 26 and reactor 10 having segments 12 to be machined during electrical discharge machining to effect polishing thereof. The particle size of the polishing abrasive particles is selected to effect polishing of the reactor thrust washer segments 12 while being easily filtered by filter 24 from the dielectric fluid 22 recirculated by pump P during machining. The amount of polishing particles present can be determined empirically and controlled using valve 34 to achieve a desired surface roughness or finish. Filtration of the dielectric fluid assures that the recirculated fluid 22a is free of errant polishing particles that are detrimental to the operation of pump P.

In an embodiment of the invention offered for purposes of illustration and not limitation, the working surface 26a of the electrode tool 26 was generated by replicating the thrust washer segment surfaces of a phenolic resin torque reactor. For example, FIG. 3 is a three dimensional image of reactor thrust washer segments 12' of a phenolic resin reactor which were replicated in negative or reverse image on the EDM electrode tool working surface 26a as reverse image segment working surfaces 26b. The electrode working surface 26a can be generated from drawings or otherwise to achieve a particular electrode working tool surface to EDM and polish the segment surfaces 12a to final desired shape and dimension.

Figure 4A:
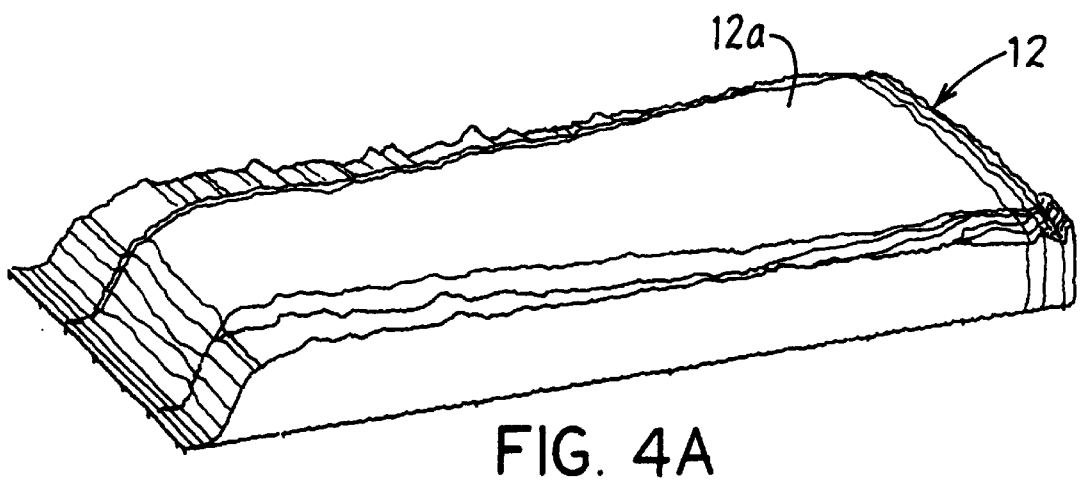
FIGS. 4A, 4B, and 4C are three dimensional laser profilometer images of thrust washer segments of a die cast aluminum alloy torque converter reactor with FIG. 4A showing a thrust washer segment in the as-die cast condition, FIG. 4B showing a similar thrust washer segment in the as electrical discharge machined condition, and FIG. 4C showing a similar thrust washer segment in the as electrical discharge machined condition with an oil retention recess centered in the segment.
Figure 4B:
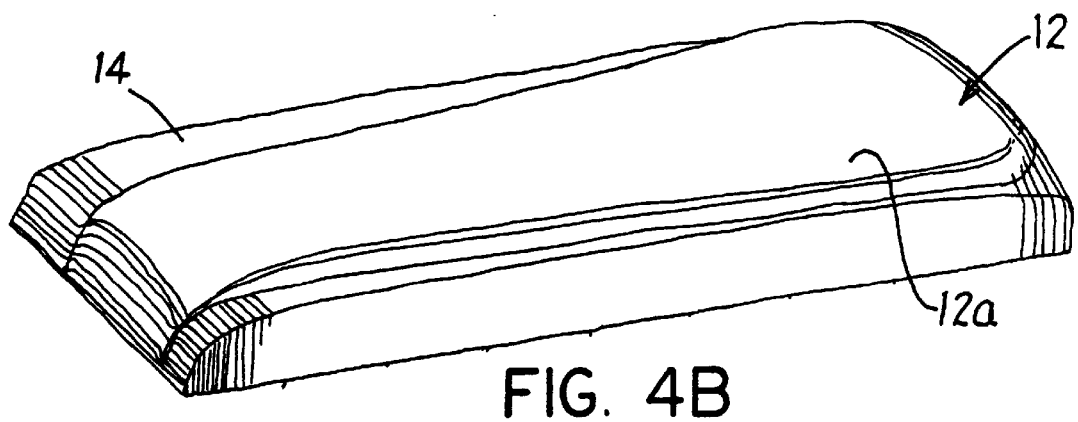

Referring to FIG. 4A, a three dimensional image of an individual reactor thrust washer segment 12 of the die cast aluminum alloy torque converter reactor of FIG. 1 is illustrated and was generated by a non-contact laser profilometer manufactured by UBM Messtechnik GMBH. The aluminum alloy nominally comprised, in weight percent, 0.3% Mg, 2.8% Zn, 1.5–4.5% Cu, 8.6–12.0% Si, 1.3% Fe, 0.5% Ni, 0.3% Sn, 0.5% Mn, and 0.2% Pb and is designated as HD2 alloy by Gibbs Die Casting Corporation, 369 Community Dr., Henderson, Ky. The surface roughness $R_a$ (absolute surface roughness) of the die cast segment surfaces 12a typically was greater than 10 microns (e.g. 10.7 microns) as compared to a surface roughness $R_a$ of less than 0.5 microns for molded phenolic resin reactor segment surfaces. FIG. 4B is three dimensional laser profilometer image of a similar individual HD2 alloy reactor segment 12 after EDM machining of the thrust washer segments 12 pursuant to the invention under conditions described above (sans vibrator 28 and abrasive polishing particulates in the dielectric fluid) . The surface roughness $R_a$ of the electrical discharge machined segments 12 was reduced from 10.7 microns as die cast, FIG. 4A, to less than 1 micron, FIG. 4B, as machined. The macrohardness of the electrical discharge machined segment surfaces 12a, FIG. 4B, was 65 HK (Knoop scale) as compared to a surface macrohardness of 45 HK for the as-die cast thrust segment surfaces 12a shown in FIG. 4A. This increase in macrohardness of the machined segment surfaces 12a is attributable to melting and rapid solidification of the aluminum alloy and dispersion of fine silicon or silicon carbide reaction product particles in the surface layer during machining as described in U.S. Pat. No. 5 480 496, the teachings of which are incorporated herein by reference to this end. Aluminum alloys including silicon, such as aluminum alloy AA300 series that are surface hardenable during electrical discharge machining, are preferred to this end in practicing the invention.

The amount of material that was removed from the reactor segments 12 by the above electrical discharge machining treatment was rather small and in the range of 20 to 500 micrometers on all thrust segment surfaces 12a. The dimensions of the die cast reactor segments 12 can be adjusted to accommodate this subsequent removal of material therefrom to achieve a selected design dimensional tolerance of the segments 12. As mentioned above, use of the vibrator 28 and abrasive polishing particles in the dielectric fluid is optional to decrease the time needed to achieve the reduced surface roughness of less than 1 micron $R_a$ on segment surfaces 12a. Moreover, the invention envisions conducting a thrust washer segment polishing operation, such as lapping, chemical polishing, electrochemical polishing, etc., as a separate step subsequent to the electrical discharge machining operation to achieve a desired surface finish on the thrust washer segment surfaces 12a.

Figure 4C:
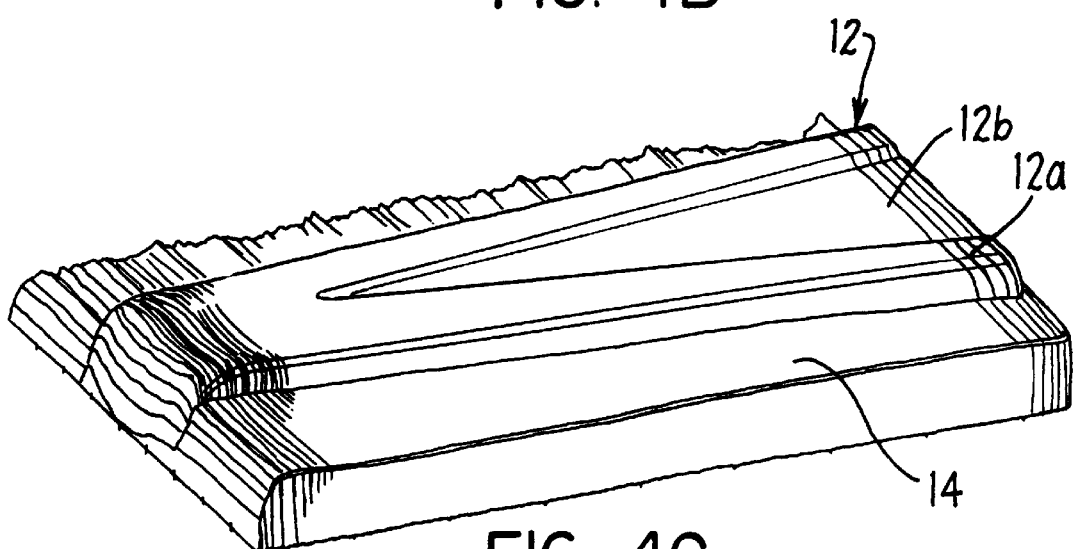

FIG. 4C is a three dimensional laser profilometer image of a similar HD2 alloy individual reactor thrust washer segment in the as-electrical discharge machined condition pursuant to the invention to form an oil retention valley or recess 12b on each surface 12a of the die cast aluminum alloy torque converter reactor 10 of FIG. 1. Electrical discharge machining was conducted under conditions as described (sans vibrator 28 and abrasive polishing particulates in the dielectric fluid) for a time long enough to form the oil retention valley or recess in each segment surface 12a. The surface roughness $R_a$ of the as-machined segment surfaces 12a was less than 1 micron and the macrohardness thereof was 65 Knoop. The oil retention valley or recess 12b was formed generally centrally in each segment surface 12a extending along a radial direction of the segments 12 and had a depth of about 11 micrometers. The oil retention recess 12b can be formed in shorter time by using a electrode working surface 26b with a surface region suitably configured in the reverse image of the recess.

Generally, practice of the invention will reduce surface roughness of the reactor thrust washer segment surfaces 12a from a value of greater than about 10 microns in the as die cast condition to less than about 1 micron in the as electrical discharge machined condition and increase their hardness from a value of about 45 Knoop (as die cast) to about 65 Knoop and greater as machined, depending upon the aluminum alloy used. Moreover, the oil retention recess 12b can be formed in each segment 12 to a depth relative to segment surface 12a to provide a hydrodynamic bearing during torque converter operation.

The die cast aluminum alloy torque converter reactors described above having as-die cast integral thrust washer segment surfaces 12a shown in FIG. 4A and having electrical discharge machined segment surfaces with reduced surface roughness as shown in FIGS. 4B and 4C pursuant to the invention were subjected to transmission dynamometer testing for 25 hours at a speed ratio of 0.1 and 120 ft.lbs. at the impeller. The as-die cast torque converter reactor thrust washer segments (FIG. 4A) exhibited almost complete wearing away after only 10 hours of transmission dynamometer testing. In contrast, the torque converter reactors treated pursuant to this invention (FIGS. 4B and 4C) exhibited no observable wear of the treated segments after 25 hours of similar testing.

While the invention is described above in terms of specific embodiments, it is not intended to be limited thereto but rather only to the extent set forth in the following claims.

What is claimed is:

1. Method of making an automatic transmission torque converter reactor, comprising casting a metallic material to form a torque converter reactor casting having an integrated thrust washer with a plurality of washer segments on a reactor hub and selectively electrical discharge machining said washer segments in a dielectric fluid using a conductive electrode shaped to impart a bearing surface profile to said washer segments and reduce surface roughness of said washer segments below about 10 microns $R_a$.

2. The method of claim 1 including concurrently electrical discharge machining and vibratory polishing said segments by vibrating said electrode and providing polishing particles in said fluid.

3. The method of claim 1 further including polishing said segments subsequent to electrical discharge machining.

4. The method of claim 3 wherein said electrode is electrically pulsed at a frequency that is desynchronized relative to a frequency of vibration of said electrode.

5. The method of claim 1 including electrical discharge machining said segments to increase the surface hardness thereof.

6. The method of claim 5 including reducing surface roughness of said segments from a die cast value of greater than about 10 microns to less than about 1 micron $R_a$ and increasing their hardness from a die cast value of about 45 Knoop to 65 Knoop and greater.

7. The method of claim 1 including electrical discharge machining said segments to form an oil retention recess therein.

8. The method of claim 1 wherein said metallic material comprises a surface hardenable aluminum alloy that is die cast to form said reactor casting.

9. A cast automatic transmission torque converter reactor comprising aluminum cast to have a plurality of reactor thrust washer segments on a hub, said segments having been selectively electrical discharge machined to have a surface roughness of less than about 1 micron $R_a$.

10. The reactor of claim 9 having segment surface hardness of about 65 Knoop and greater.

11. The reactor of claim 9 wherein said aluminum comprises a surface hardenable aluminum alloy.

12. The reactor of claim 9 including an oil retention recess electrical discharge machined in each said segment.

13. A die cast automatic transmission torque converter reactor, comprising a surface hardenable aluminum alloy die cast to have a plurality of reactor thrust washer segments on a reactor hub, said segments having been selectively electrical discharge machined to have a surface roughness of less than about 1 micron $R_a$ and a hardness of about 65 Knoop and greater.

* * * * *